US011100139B2

(12) United States Patent
Laligand et al.

(10) Patent No.: US 11,100,139 B2
(45) Date of Patent: Aug. 24, 2021

(54) COMBINED ACTIVITIES HISTORY ON A DEVICE

(71) Applicant: Google LLC, Mountain View, CA (US)

(72) Inventors: Pierre-Yves Laligand, Palo Alto, CA (US); Stephen Shiu Lam Leung, Cupertino, CA (US); Justin Koh, Mountain View, CA (US); Richard William Bragg, Los Altos, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 15/860,538

(22) Filed: Jan. 2, 2018

(65) Prior Publication Data

US 2018/0129728 A1 May 10, 2018

Related U.S. Application Data

(63) Continuation of application No. 14/349,642, filed as application No. PCT/US2012/058475 on Oct. 2, 2012, now Pat. No. 9,858,329.

(Continued)

(51) Int. Cl.
*G06F 16/00* (2019.01)
*G06F 16/28* (2019.01)
(Continued)

(52) U.S. Cl.
CPC ........... *G06F 16/285* (2019.01); *G06Q 30/00* (2013.01); *G06Q 30/02* (2013.01); *G06Q 50/01* (2013.01)

(58) Field of Classification Search
CPC .................................................... G06F 16/00
See application file for complete search history.

(56) References Cited

U.S. PATENT DOCUMENTS 8,548,991 B1  10/2013 Zamir et al.
8,639,681 B1 * 1/2014 Dyvadheenam .... G06F 16/9566
                                                        707/707
(Continued)

FOREIGN PATENT DOCUMENTS

CN    1822640 A    8/2006
CN    1968374 A    5/2007
(Continued)

OTHER PUBLICATIONS

Google Inc., Decision of Rejection, CN 201280059372.0, dated Jun. 3, 2016, 7 pgs (in Chinese only as of Jun. 28, 2016.

(Continued)

*Primary Examiner* — Khanh B Pham
(74) *Attorney, Agent, or Firm* — Byrne Poh LLP

(57) ABSTRACT

This application is directed to performing a plurality of activities each of which is performed in a respective application with content associated with a content type selected from a group consisting of television programming, online content, on-device application, information views, and other content types. Each activity is associated with a timestamp, and described using a predefined format covering an action and content associated with the action. Each of the plurality of activities is then logged into an activities log in accordance with the predefined format. A plurality of user selectable affordances are displayed concurrently in a home screen on a display of the client device. Each of the affordances is associated with one of the plurality of activities performed with associated content, and the plurality of affordances includes at least two affordances associated with two distinct activities of the plurality of activities performed by two distinct applications.

20 Claims, 12 Drawing Sheets

Related U.S. Application Data

(60) Provisional application No. 61/543,294, filed on Oct. 4, 2011.

(51) Int. Cl.
  *G06Q 30/02* (2012.01)
  *G06Q 30/00* (2012.01)
  *G06Q 50/00* (2012.01)

(56) References Cited

U.S. PATENT DOCUMENTS

| | | | |
|---|---|---|---|
| 2004/0098744 | A1 | 5/2004 | Gutta |
| 2006/0224608 | A1* | 10/2006 | Zamir .................. G06F 16/951 707/999.101 |
| 2006/0230058 | A1 | 10/2006 | Morris |
| 2007/0180463 | A1* | 8/2007 | Jarman .................. H04H 60/31 725/28 |
| 2009/0210516 | A1* | 8/2009 | Roskowski ............ G06Q 10/06 709/219 |
| 2010/0124407 | A1 | 5/2010 | Ahn et al. |
| 2011/0107226 | A1 | 5/2011 | Heo |
| 2011/0276396 | A1 | 11/2011 | Rathod |
| 2012/0084828 | A1 | 4/2012 | Rowe et al. |
| 2012/0089996 | A1 | 4/2012 | Ramer et al. |

FOREIGN PATENT DOCUMENTS

| | | |
|---|---|---|
| CN | 101527812 A | 9/2009 |
| CN | 101815994 A | 8/2010 |
| KR | 20010050381 | 6/2001 |
| KR | 20020094027 | 12/2002 |
| KR | 100444695 | 8/2004 |
| KR | 2005-0107040 | 11/2005 |
| KR | 10-0783551 | 12/2007 |
| KR | 2007-0118165 | 12/2007 |
| KR | 20080052560 | 6/2008 |
| KR | 2009-0017155 | 2/2009 |
| KR | 20090025301 | 3/2009 |
| KR | 2009-0113310 | 10/2009 |
| KR | 2010-0045195 | 5/2010 |

OTHER PUBLICATIONS

Google Inc., International Preliminary Report on Patentability, PCT/US2012/058475, dated Apr. 8, 2014, 7 pages.
Google Inc., International Search Report and Written Opinion, PCT/US2012/058475, dated Mar. 28, 2013, 9 pgs.
Google Inc., Notice to File a Response, KR 2014-7012076, dated Jun. 30, 2016, 8 pgs (in Korean only as of Jul. 6, 2016).
Google Inc., Notice to File a Response, KR 2014-7012076, dated Aug. 31, 2015, 11 pgs.
Google Inc., Notification of First Office Action, CN 201280059372.0, dated Jan. 15, 2015, 9 pgs.
Google Inc., Notification of Second Office Action, CN 201280059372.0, dated Sep. 2015, 8 pgs.
Google Inc., Notification of Third Office Action, CN 201280059372.0, dated Feb. 25, 2016, 9 pgs.
Google Inc., Supplementary European Search Report, EP 12838534.1, dated Jun. 16, 2015, 8 pgs.
Google Inc., Notice of Final Rejection, Korean Patent App. No. PCT 10-2014-7012076, dated May 8, 2017, 3 pgs.
Notice of Allowance dated Feb. 13, 2019 in KR Patent Application No. 10-2017-7015814.
Notice of Allowance dated Aug. 29, 2017 in U.S. Appl. No. 14/349,642.
Notice of Allowance dated Sep. 28, 2020 in KR Patent Application No. 10-2020-7004793.
Office Action dated Jan. 18, 2018 in KR Patent Application No. 10-2017-7015814.
Office Action dated Mar. 24, 2020 in KR Patent Application No. 10-2020-7004793.
Office Action dated Apr. 24, 2017 in U.S. Appl. No. 14/349,642.
Office Action dated May 20, 2016 in U.S. Appl. No. 14/349,642.
Office Action dated May 28, 2019 in CN Patent Application No. 201810076745.4.
Office Action dated Jun. 30, 2018 in KR Patent Application No. 10-2017-7015814.
Office Action dated Oct. 10, 2018 in KR Patent Application No. 10-2017-7015814.
Office Action dated Oct. 15, 2019 in CN Patent Application No. 201810076745.4.
Office Action dated Nov. 14, 2018 in CN Patent Application No. 201810076745.4.
Office Action dated Dec. 1, 2016 in U.S. Appl. No. 14/349,642.
Office Action dated Dec. 24, 2015 in U.S. Appl. No. 14/349,642.

* cited by examiner

| | 404 | 406 | 408 |
|---|---|---|---|
| 402-1 | View | http://www.abcde.com | 2011-09-15 GMT15:00:00 |
| 402-2 | View | http://www.abcde.com/customerhelp/shipping.html | 2011-09-15 GMT15:03:00 |
| 402-3 | View | http://www.abcde.com/shopsearch?q="laptop" | 2011-09-15 GMT15:07:54 |
| 402-4 | View | http://specials.abcde.com/ | 2011-09-15 GMT15:23:05 |
| 402-5 | Main | app://sportscores | 2011-09-15 GMT15:37:00 |
| 402-6 | View | tv://channel/xyztv | 2011-09-15 GMT15:45:00 |
| 402-7 | View | http://www.sports.com | 2011-09-15 GMT16:04:00 |
| 402-8 | Main | os://com.device.to.settings/.settings.network | 2011-09-15 GMT16:13:32 |
| 402-9 | Main | home://whatson | 2011-09-15 GMT16:04:00 |
| 402-10 | Main | search://search?q=hockey | 2011-09-15 GMT16:13:32 |

┌─────────────────────────────────────────────────────────────┐
│ Perform a first activity with content associated with a first content type
│ selected from the group consisting of television programming, online content,
│ on-device application, search queries, information views, and other content    — 602
│ types described using a predefined format, wherein the predefined format
│ includes an action specification and a content specification
│ ┌─────────────────────────────────────────────────────────┐ — 604
│ │ The predefined format includes a Uniform Resource Identifier (URI) │
│ └─────────────────────────────────────────────────────────┘
│ ┌─────────────────────────────────────────────────────────┐ — 606
│ │ The first content type is online content │
│ └─────────────────────────────────────────────────────────┘
└─────────────────────────────────────────────────────────────┘

↓

Log the first activity in accordance with the predefined format — 608

↓

┌─────────────────────────────────────────────────────────────┐
│ Perform a second activity with content associated with a second content type
│ selected from the group consisting of television programming, online content,
│ on-device applications, search queries, information views, and other content   — 610
│ types described using the predefined format, the second content type being
│ distinct from the first content type
│ ┌─────────────────────────────────────────────────────────┐ — 612
│ │ The second content type is television programming │
│ └─────────────────────────────────────────────────────────┘
└─────────────────────────────────────────────────────────────┘

↓

Log the second activity in accordance with the predefined format — 614

↓

┌─────────────────────────────────────────────────────────────┐
│ Perform a third activity on content associated with a third content type
│ selected from the group consisting of television programming, online content,
│ on-device applications, search queries, information views, and other content   — 616
│ types described using the predefined format, the third content type being
│ distinct from the first content type and from the second content type
│ ┌─────────────────────────────────────────────────────────┐ — 618
│ │ The third content type is on-device application │
│ └─────────────────────────────────────────────────────────┘
└─────────────────────────────────────────────────────────────┘

↓

Log the third activity in accordance with the predefined format — 620

Figure 6

COMBINED ACTIVITIES HISTORY ON A DEVICE

RELATED APPLICATIONS

This application is a continuation of and claims priority to U.S. patent application Ser. No. 14/349,642, filed on Apr. 3, 2014, which is a United States National Stage Application filed under 35 U.S.C. § 371 of PCT Patent Application Serial No. PCT/US2012/058475 filed on Oct. 2, 2012, which claims the benefit of and priority to U.S. Provisional Patent Application No. 61/543,294 filed on Oct. 4, 2011, all of which are hereby incorporated by reference in their entirety.

BACKGROUND

The disclosed implementations relate generally to device management.

Devices today are designed to handle activities with respect to many different types of content. For example, a device may allow users to watch television channels, browse web pages, and run applications. Typically, activities on distinct content types are logged in separate histories, in different formats, and the separate histories are displayed to the user separately. However, such separation does not give the user a holistic view of the user's usage of the device and content consumption activity.

SUMMARY

According to some implementations, a method is performed at a client device having one or more processors and memory storing one or more programs executed by the device. The method includes: performing a first activity with content associated with a first content type selected from the group consisting of television programming, online content, on-device application, search queries, information views, and other content types described using a predefined format, wherein the predefined format includes an action specification and a content specification; logging the first activity in accordance with the predefined format; performing a second activity with content associated with a second content type selected from the group consisting of television programming, online content, on-device applications, search queries, information views, and other content types described using the predefined format, the second content type being distinct from the first content type; and logging the second activity in accordance with the predefined format.

According to some implementations, a system includes one or more processing units; and memory storing one or more programs to be executed by the one or more processing units. The one or more programs comprising instructions for: performing a first activity with content associated with a first content type selected from the group consisting of television programming, online content, on-device application, search queries, information views, and other content types described using a predefined format, wherein the predefined format includes an action specification and a content specification; logging the first activity in accordance with the predefined format; performing a second activity with content associated with a second content type selected from the group consisting of television programming, online content, on-device applications, search queries, information views, and other content types described using the predefined format, the second content type being distinct from the first content type; and logging the second activity in accordance with the predefined format.

According to some implementations, a non-transitory computer readable storage medium stores one or more programs configured for execution by a computer. The one or more programs comprising instructions for: performing a first activity with content associated with a first content type selected from the group consisting of television programming, online content, on-device application, search queries, information views, and other content types described using a predefined format, wherein the predefined format includes an action specification and a content specification; logging the first activity in accordance with the predefined format; performing a second activity with content associated with a second content type selected from the group consisting of television programming, online content, on-device applications, search queries, information views, and other content types described using the predefined format, the second content type being distinct from the first content type; and logging the second activity in accordance with the predefined format.

According to some implementations, a method is performed at a client device having one or more processors and memory storing one or more programs executed by the device. The method includes: retrieving from a log a first set of activities associated with content of a first content type, the first content type selected from the group consisting of television programming, online content, on-device applications, search queries, information views, and other content types described using a predefined format, wherein the predefined format includes an action specification and a content specification, and a second set of activities associated with content of a second content type distinct from the first content type, the second content type selected from the group consisting of television programming, online content, on-device applications, search queries, information views, and other content types described using the predefined format, wherein the first set of activities and the second set of activities are logged in accordance with the predefined format; and displaying information based on the first set of activities and the second set of activities concurrently.

According to some implementations, a system includes one or more processing units; and memory storing one or more programs to be executed by the one or more processing units. The one or more programs comprising instructions for: retrieving from a log a first set of activities associated with content of a first content type, the first content type selected from the group consisting of television programming, online content, on-device applications, search queries, information views, and other content types described using a predefined format, wherein the predefined format includes an action specification and a content specification, and a second set of activities associated with content of a second content type distinct from the first content type, the second content type selected from the group consisting of television programming, online content, on-device applications, search queries, information views, and other content types described using the predefined format, wherein the first set of activities and the second set of activities are logged in accordance with the predefined format; and displaying information based on the first set of activities and the second set of activities concurrently.

According to some implementations, a non-transitory computer readable storage medium stores one or more programs configured for execution by a computer. The one or more programs comprising instructions for: retrieving from a log a first set of activities associated with content of a first content type, the first content type selected from the group consisting of television programming, online content, on-device applications, search queries, information views, and other content types described using a predefined format, wherein the predefined format includes an action specification and a content specification, and a second set of activities associated with content of a second content type distinct from the first content type, the second content type selected from the group consisting of television programming, online content, on-device applications, search queries, information views, and other content types described using the predefined format, wherein the first set of activities and the second set of activities are logged in accordance with the predefined format; and displaying information based on the first set of activities and the second set of activities concurrently.

BRIEF DESCRIPTION OF THE DRAWINGS

FIGS. 4A and 4B are diagrams illustrating example data structures for an activities log, according to some implementations.

FIG. 6 is a flow diagram illustrating a process for logging activities at a device, according to some implementations.

DETAILED DESCRIPTION

In some implementations, activities on different types of content on a device, such as viewing a web page or TV channel, executing an application, viewing information accessed from a home screen, viewing a settings user interface, issuing a search query, or streaming content from another device, may be logged in a common format and processed as a common activities log or history. Activities associated with different types of content, such as television channel viewing, web page browsing, applications activity, search queries, accesses of particular user interfaces, content streaming, and presentation of information on the home screen, may be logged in the same predefined format, such as a Universal Resource Identifier (URI) based format. The logged activities may be analyzed and displayed together.

Figure 1:
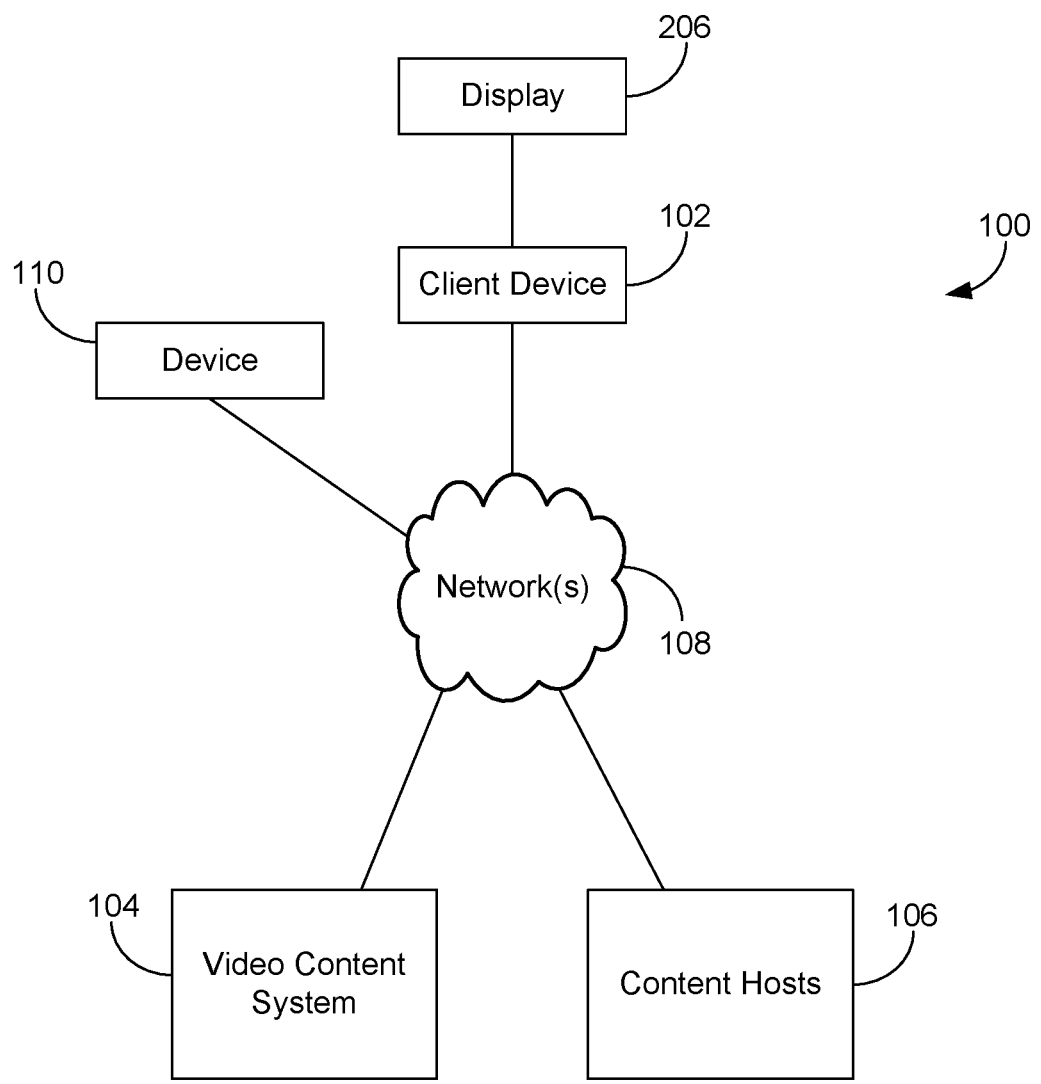
FIG. 1 is a block diagram illustrating a content consumption environment, according to some implementations.

FIG. 1 is a block diagram illustrating a content consumption environment, according to some implementations. The content consumption environment 100 includes a client device 102. The client device 102 is communicatively coupled to a video content system 104 and one or more content hosts 106 by one or more communications networks 108 (e.g., the Internet). In some implementations, the client device 102 is a set-top box, desktop computer, laptop computer, smartphone, feature phone, tablet computer, game console, television, or media player device. In some implementations, the client device includes a display 206 on which video content received from video content system 104, as well as user interfaces of the client device 102 and other content (e.g., web pages, etc.) can be presented. In such implementations, features of client devices 102 described herein can be implemented in a single device or in multiple coordinated devices. A video content system 104 transmits or broadcasts video content (e.g., television programming) to the client device 102 through the network(s) 108. Video content transmitted by the video content system 104 may be transmitted in channels. Each channel has a set of video content (e.g., movies, video clips, video podcasts, music videos, television shows). In some implementations, the video content system 104 is a cable television system, satellite television system, broadcast television system, a system that delivers television programming through fiber optic networks, or an Internet Protocol television (IPTV) system.

Content hosts 106 host content, such as web pages and other documents, applications, online video, audio, or other information or data. The client device 102 may communicate, through the network(s) 108, with a content host 106 to transmit data (e.g., requests for content) and receive content.

In some implementations, the network(s) 108 include one or more of fiber optic cable networks, coaxial cable networks, satellite networks, copper-wire based networks (e.g., digital subscriber line (DSL), phone line, WAN, LAN, the Internet, etc.), wireless networks (e.g., Wi-Fi, broadcast), or any mix or combination of the above.

In some implementations, client devices 102 are coupled to the networks 108 using multiple connections. For example, a client device 102 may connect to the networks 108 using a satellite connection and an Ethernet connection. The satellite connection may be used to receive content from the video content system 104 (e.g., where the video content system 104 is a satellite television system), and the Ethernet connection is used to receive content from and transmit data to content hosts 106. As another example, the client device 102 may connect to the networks 108 using both a wireless (e.g., Wi-Fi) connection and an optical fiber connection.

In some implementations, the client device 102 may access and present content (e.g., video, music, photos) from another device 110 through network(s) 108). The device 110 may, for example, be a digital media server. The device 110 may be another device in the same local network as the client device 102, or a remote device. In some implementations, client device 102 and the device 110 are Digital Living Network Alliance (DLNA) certified devices.

Figure 2:
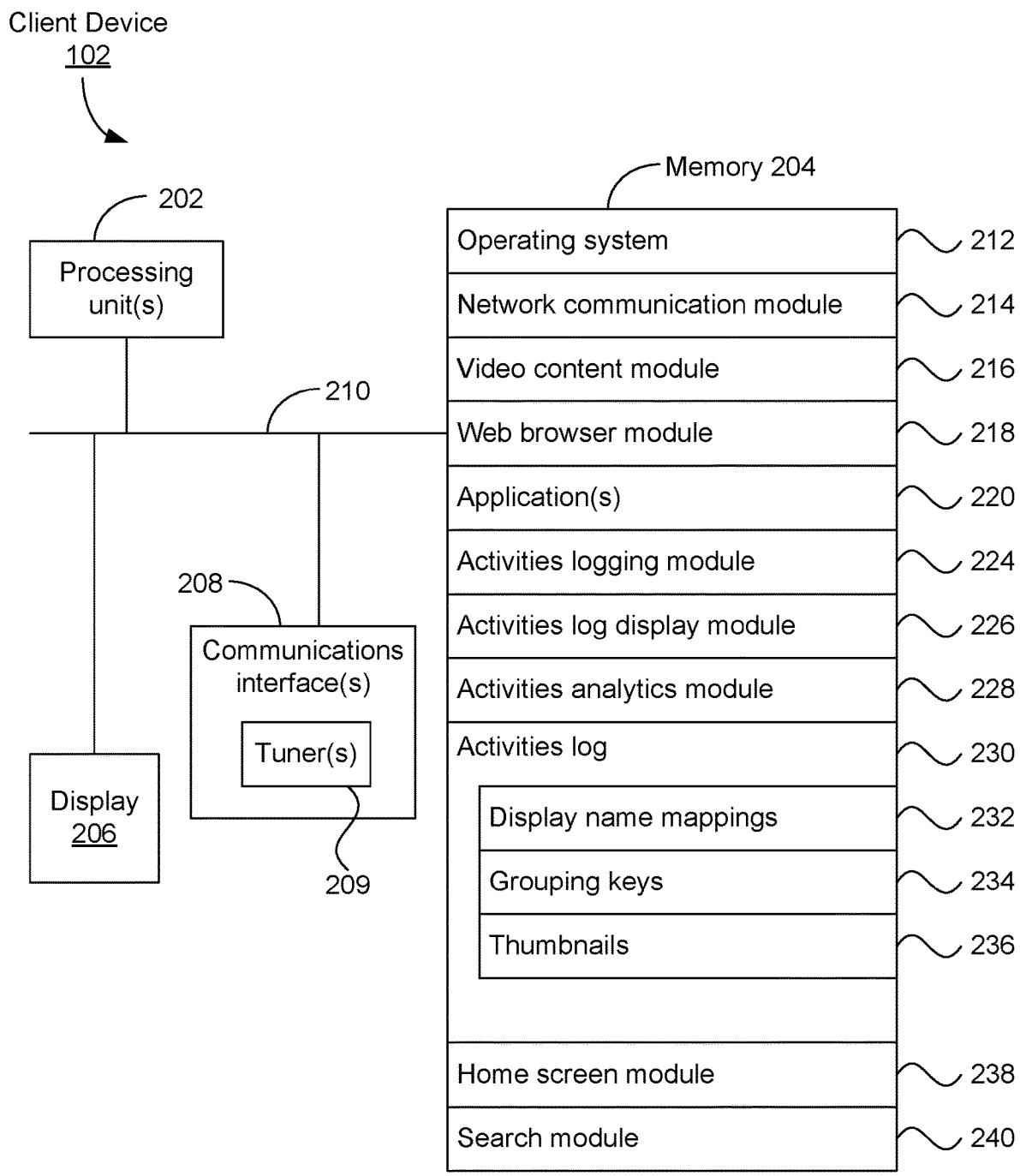
FIG. 2 is a block diagram illustrating a client device, according to some implementations.

FIG. 2 is a block diagram illustrating a client device, according to some implementations. A client device 102 typically includes one or more processing units (CPU's) 202, one or more network or other communications interfaces 208, memory 204, and one or more communication buses 210 for interconnecting these components. In some implementations, the communications interfaces 208 include one or more tuners 209 for tuning to channels in content signals transmitted from video content system 104. The client device 102 also includes a display 206. In some implementations, the display 206 is integrated into the client device 102. For example, the client device 102 may be a television configured to be able to access the Internet and run applications. In some other implementations, the display 206 is a distinct device from the client device 102 and the client device 102 outputs to the display 206 by a wired or wireless connection. For example, the client device 102 may be a set-top box coupled to a display (e.g., a television).

Figure 5A:
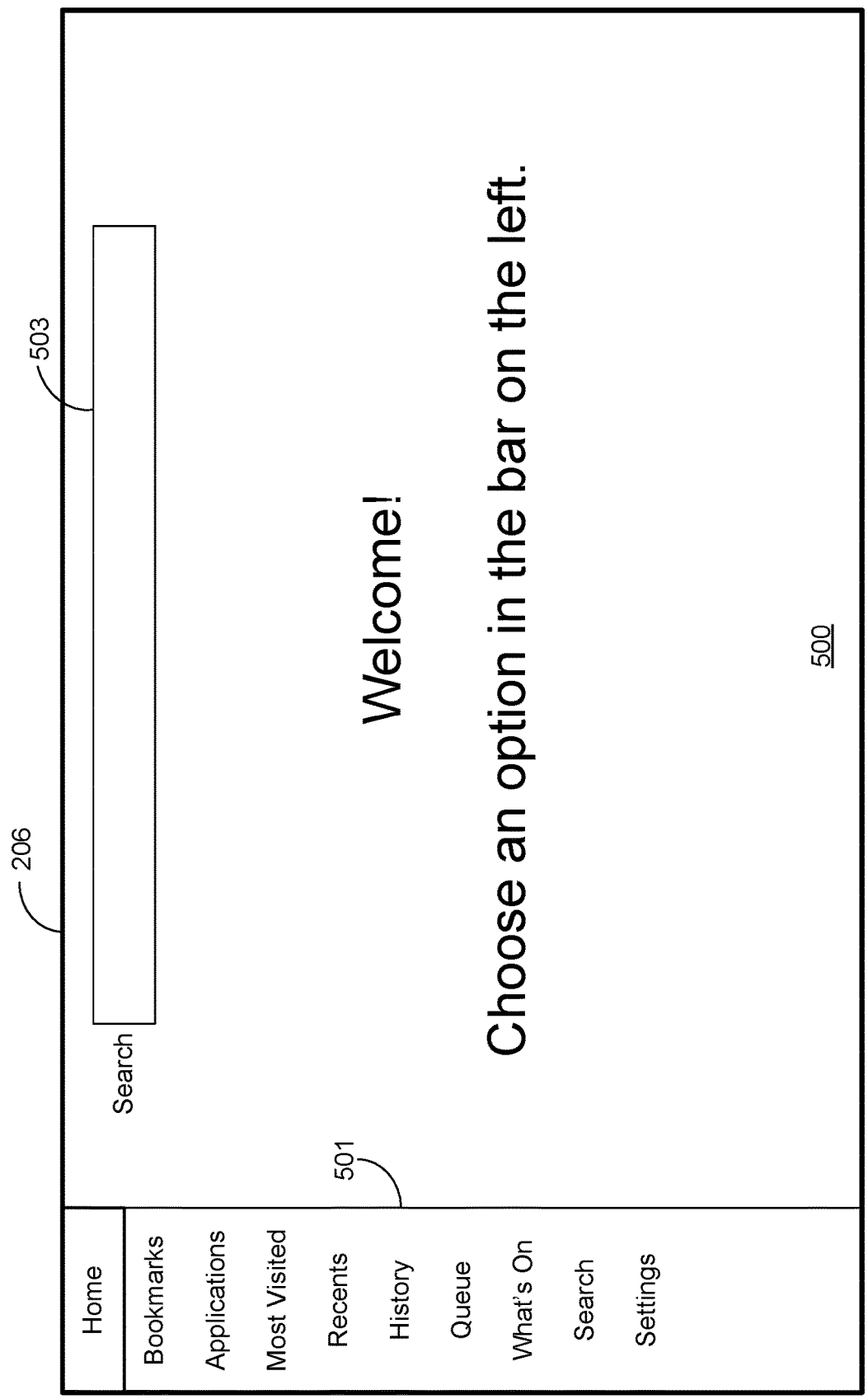
FIGS. 5A-5D are schematic diagrams illustrating example screenshots of content activities information being displayed, according to some implementations.
Figure 5B:
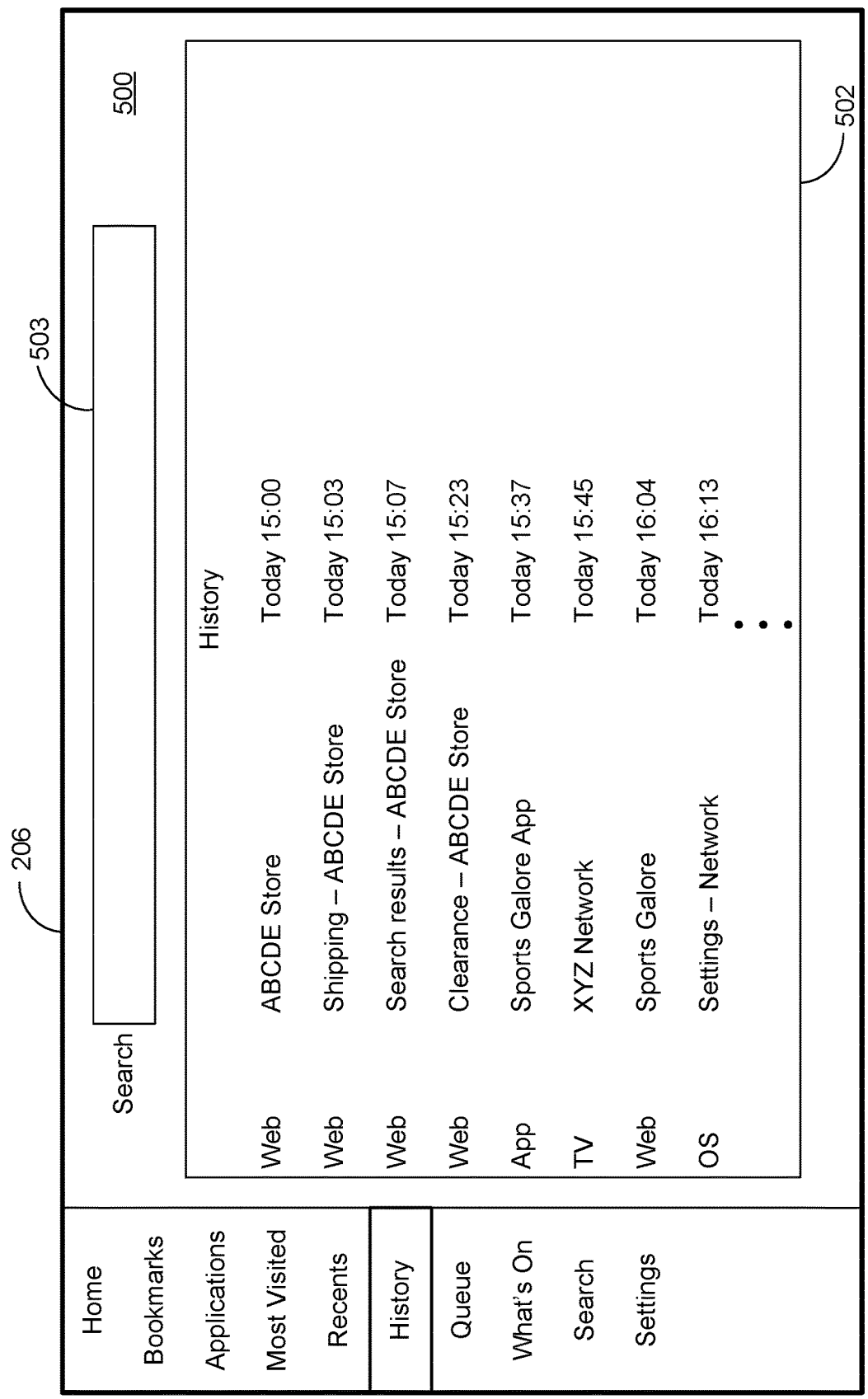
Figure 5C:
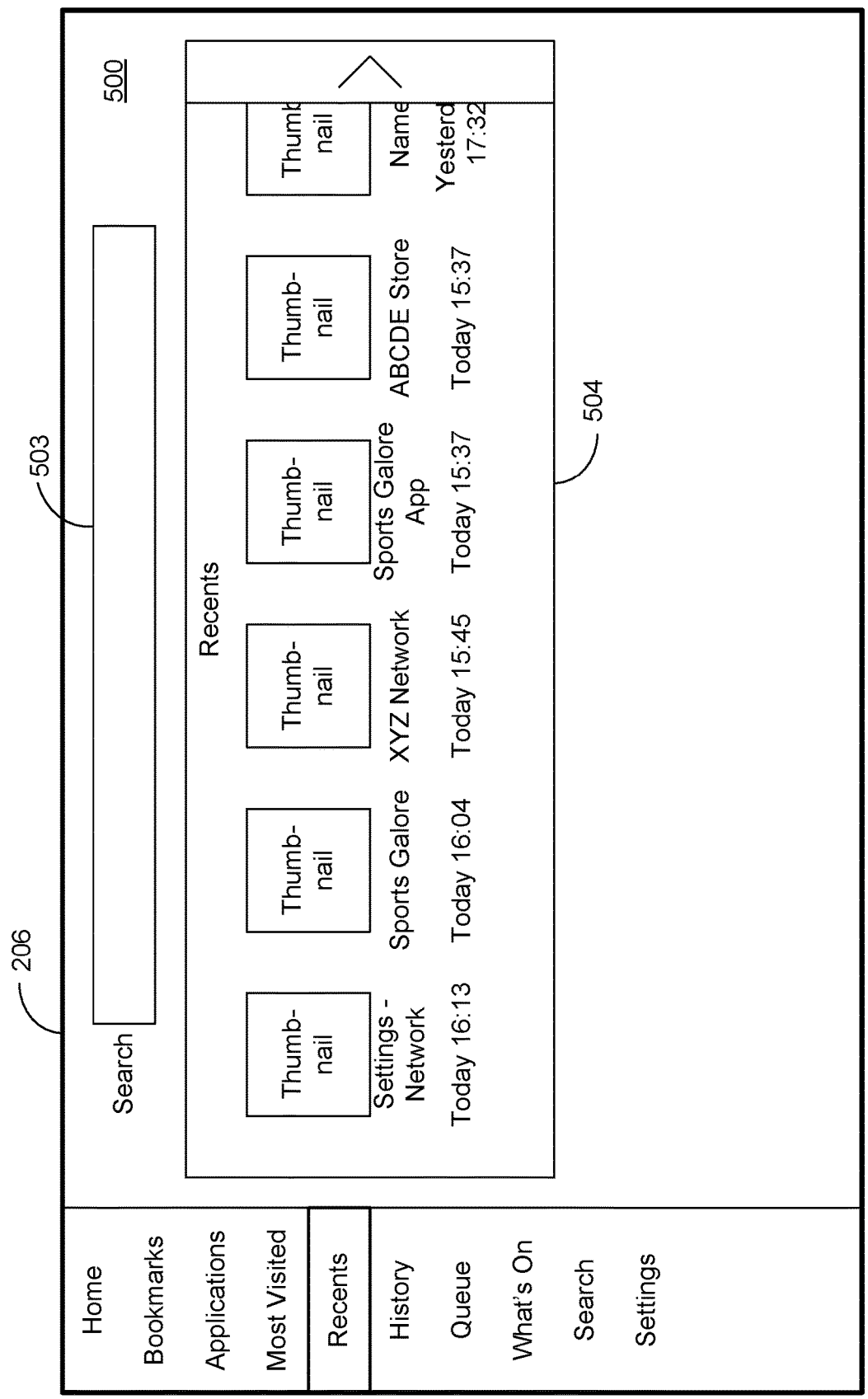

Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the processing unit(s) 302. Memory 204, or alternately the non-volatile memory device(s) within memory 204, comprises a non-transitory computer readable storage medium. In some implementations, memory 204 or the computer readable storage medium of memory 204 stores the following programs, modules and data structures, or a subset thereof:

- an operating system 212 that includes procedures for handling various basic system services and for performing hardware dependent tasks;
- a network communication module 214 that is used for connecting the client device 102 to other or systems (e.g., video content system 104, content hosts 106) via the one or more communication network interfaces 208 (wired or wireless) and one or more communication networks 108, such as the Internet, other wide area networks, local area networks, metropolitan area networks, cable televisions systems, satellite television systems, IPTV systems, and so on;
- a video content module 216 for tuning to specified channels in video content signals received from the video content system, processing (e.g., decoding) the video content signals, and displaying video content decoded from the video content signals;
- a web browser module 218 (which, in some implementations, is one of the applications 220) for rendering and displaying web pages received from content hosts 106;
- one or more applications 220 for performing a variety of operations and accessing various content, including applications that primarily execute on the client device 102, such as games and office applications, and third party applications that access remote media content and present that content for local users, such as a remote media streaming application;
- an activities logging module 224 for logging activities on the client device 102 into an activities log 230;
- an activities log display module 226 for displaying information based on the activities log 230;
- an activities analytics module 228 for performing analytics on the activities log 230;
- the activities log 230, which stores the log data of activities logged by activities logging module 224; and
- a home screen module 238 for presenting content and information on a home screen interface of the client device 102; and
- a search module 240 for searching for content stored on the client device 102, content that is available on connected devices (e.g., device 110), content listed in television programming guides, and so on, including processing queries received in a quick search bar (e.g. quick search bar 503, FIGS. 5A-5C).

The activities log 230 further includes display name mappings 232, grouping keys 234, and thumbnails 236. Display name mappings 232 map content that are identified in the activities log 230 to user-friendly names for displaying to users. Grouping keys 234 specify one or more keys based on which logged activities in the activities log 230 may be grouped together for display and analytics purposes. Thumbnails 236 include thumbnail images that may be associated with activities or groups of activities in the activities log 230 and displayed when information corresponding to the associated activities or groups of activities are displayed to users.

FIG. 2 is intended more as functional descriptions of the various features which may be present in a device than as a structural schematic of the implementations described herein. In practice, and as recognized by those of ordinary skill in the art, items shown separately could be combined and some items could be separated.

Figure 3:
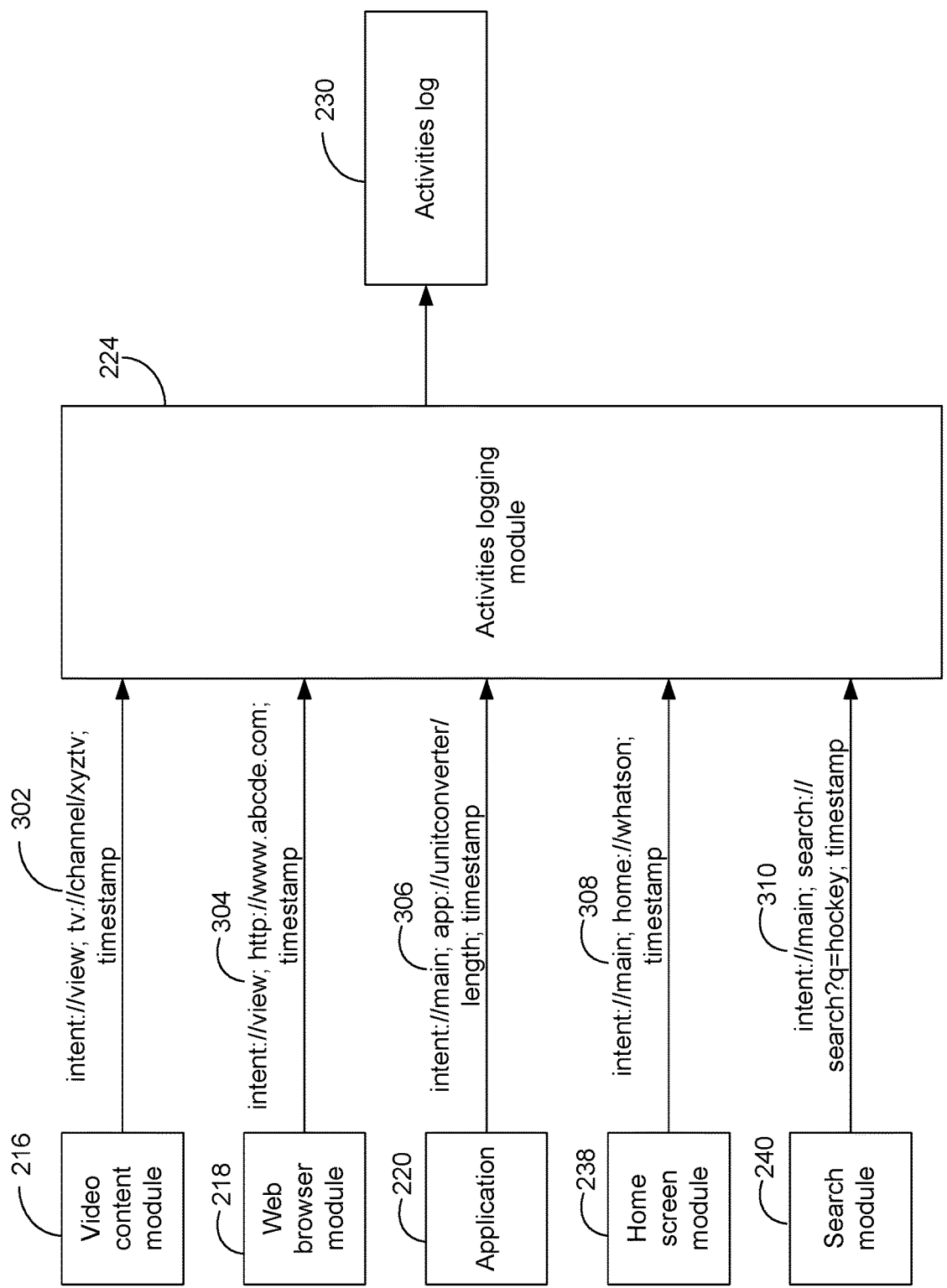
FIG. 3 is a block diagram illustrating interaction between modules associated with content activities and an activities logging module, according to some implementations.

FIG. 3 is a block diagram illustrating interaction between modules associated with content activities and an activities logging module, according to some implementations. At the client device 102, the activities logging module 224 logs activities performed by other modules, e.g., the video content module 216, the web browser module 218, and applications 220.

An activity performed by a module may be reported to the activities logging module 224 in a message sent from the module to the activities logging module 224. In some implementations, the messages sent to the activities logging module 224 by modules performing activities are intent messages. An example of intent messages is intent messages in the ANDROID™ operating system, where an intent is an abstract description of an operation to be performed. It should be appreciated, however, that other ways of reporting and logging activities are possible, as long as the activities are reported and logged in accordance with the same format regardless of the type of content and the form of the action.

A message reporting an activity (e.g., an intent message) sent from a module to the activities logging module 224 may include an action involved in the activity, the content acted upon, and a timestamp of the activity. The messages sent by the various modules are formatted in a common format. In some implementations, the common format is based on the Uniform Resource Identifier (URI) format; the action and the content are specified in the message in URI syntax. For example, in an intent message, the action may be expressed as the string "intent://[action]" where the "[action]" string (e.g., "view," "main," "edit," "send," etc.) specifies the action, and the content may be expressed as "[type]://[path]" where the "[type]" string specifies the content type (e.g., "tv" for television channels, "app" for applications, "http" for web pages accessed using the Hypertext Transfer Protocol (HTTP), "home" for information views displayed on the home screen, "qs" for searches performed using a quick search bar), and the "[path]" string identifies the content (e.g., "www.abcde.com/customerhelp/shipping.html", "channel/xyztv", "app://unitconverter", "home://whatsnew", "search://search?q=hockey"). In some implementations, the "[type]://[path]" string for a web page is the same as the Uniform Resource Locator (URL) address of the web page; for content that has a URL (e.g., web pages, other online documents), the URL is used for the content string.

The video content module 216 may send an intent message 302 to the activities logging module 224. The intent message 302 in FIG. 3 corresponds to a tuning, by the video content module 216, to a specified channel (to have video content on the specified channel displayed). The intent message 302 includes an action to view a channel (i.e., tune to the channel) ("intent://view"), the viewed channel ("tv://channel/xyztv"), and a timestamp of the action.

The intent message 304, sent by the web browser module 218 to the activities logging module 224, corresponds to a view of a web page. The intent message 304 includes an action to view a web page ("intent://view"), an address (e.g., the URL) of the viewed web page ("http://www.abcde.com"), and a timestamp of the action.

The intent message 306, sent by an application 220 to the activities logging module 224, corresponds to an access of a page or interface in the application. Using the example of a unit converter application, the intent message 306 includes an action to open a page or interface ("intent://main"), an identifier of the application and the opened page ("app://unitconverter/length"), and a timestamp of the action.

The intent message 308, sent by the home screen module 238 to the activities logging module 224, corresponds to an information view ("What's On") in the home screen interface of the client device 102. The intent message 308 includes an action to display the "What's On" view ("intent://main"), the information view being displayed ("home://whatson"), and a timestamp of the action.

The intent message 310, sent by the search module 240 to the activities logging module 224, corresponds to a search in the quick search bar 503 (the query is "hockey"). The intent message 310 includes an action to perform the search and to present the search results ("intent://main"), the query ("search://search?q=hockey"), and a timestamp of the action.

While FIG. 3 describes messages sent to the activities logging module 224 by the video content module 216, the web browser module 218, or applications 220, other modules in the client device 102 also may send messages reporting activities to the activities logging module 224 for logging into the activities log 230. For example, the operating system 212 (and sub-modules of the operating system 212) may send messages to the activities logging module 224.

Figure 4B:
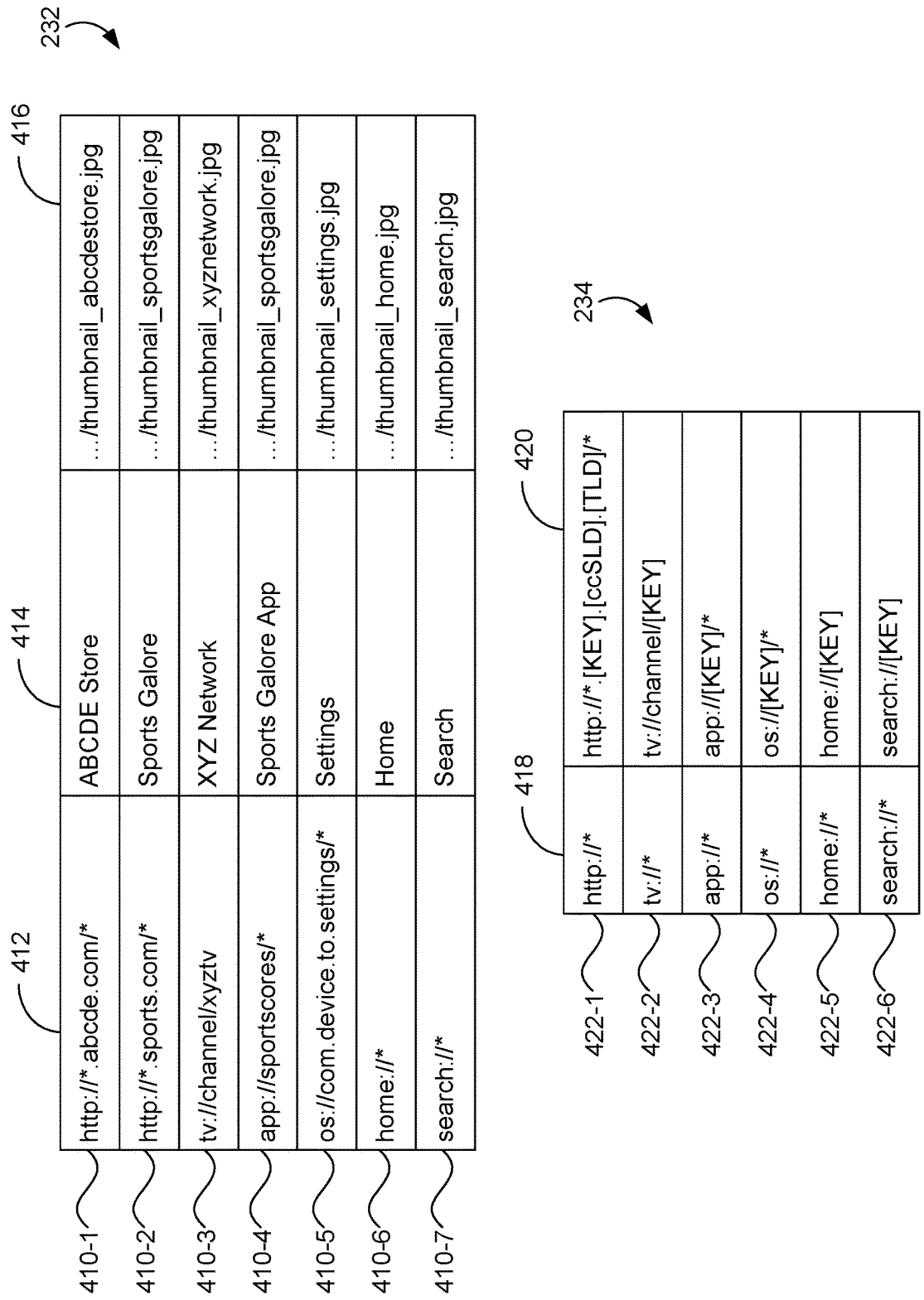

The activities logging module 224 receives messages reporting activities sent from various modules (e.g., the video content module 216, web browser module 218, applications 220) and stores the information in these messages in the activities log 230. FIGS. 4A and 4B illustrate example data structures for the activities log 230. In FIG. 4A, the activities log 230 stores, for an entry 402 corresponding to a reported activity, the action 404, the content 406 acted upon, and the timestamp 408 of the action. The action 404 stores the "[action]" string extracted from the "intent://[action]" string in a message. In some implementations, the action 404 store the entire "intent://[action]" string as is. The content string 406 stores the content string ("[type]://[path]") that is included in the message as is. In some implementations, instead of storing the action and the content as separate fields 404 and 406, respectively, the entire message for an activity (e.g., intent message 302, 304, 306, 308, or 310), save the timestamp, is stored as is in a single field, and the corresponding timestamp is stored in a separate field (e.g., timestamp 408).

The activities log 230 may log activities that are associated with content items that are not exactly the same item but are nevertheless related. For example, the activities log 230 may log views of different web pages within the same domain. As an example, activities 402-1 thru 402-4 correspond to activities associated with web pages in the "abcde.com" domain. Other examples of related content include different pages or interfaces within the same application, an interface (e.g., settings) and its sub-interfaces within the operating system, or television programs from the same channel or network viewed on the client device 102. Activities corresponding to related content may be grouped together for display and/or analytics purposes. For example, views of web pages under the same domain may be grouped together and displayed as one. In some implementations, when activities associated with related content are grouped, the count of activities for the group does not reduce to one, but is the sum of the number of activities that are grouped together.

In some implementations, content referenced in the activity log 230 may be mapped to user-friendly display names. A display name may be displayed in place of a content string (i.e., "[type]://[path]") that is stored in the activity log 230, as the content string may be confusing to the user and overly long. Further, when activities associated with related content are grouped together, the display name may be displayed to represent the group of activities. FIG. 4B illustrates examples of display name mappings 232 from content strings 412 to display names 414. Mappings 410-1 and 410-2 map content strings under specified domains to specified names. For example, Mapping 410-1 maps URLs for pages in the "abcde.com" domain to the name "ABCDE Store." Mapping 410-3 maps a URI corresponding to a television channel to the name of the television channel. Mapping 410-4 maps a URI corresponding to an application and interfaces in the application to the name of the application. Mapping 410-5 maps an interface and its sub-interfaces in the operating system 212 (e.g., the settings interface and its sub-interfaces) to the name "Settings." Mappings 410-6 maps a view on the home screen to the name "Home." Mappings 410-7 maps a search query the name "Search."

In some implementations, content strings 412 and display names 414 are also associated with respective thumbnail images 236 that may be displayed whenever information corresponding to a content string and/or the display name is displayed. Thumbnail paths 416 identify the thumbnail 236 corresponding to respective content strings 412 and display names 414.

As described above, activities associated with related content may be grouped together or aggregated into one for display and analytics purposes. Grouping keys 234 may be specified to identify the keys on which content may be considered to be related. A key specification 422 in the grouping keys 234 specifies a key for a respective content type 418. For example, key specification 422-1 specifies that for web pages (content strings that start with "http://"), the key is the domain name portion that includes the top level domain (TLD) (either a generic TLD or a country code TLD), optionally a country code second level domain (ccTLD) (for domains where the TLD is a country code TLD), and then the first subdomain string after the TLD and ccSLD. Thus, for example, in FIG. 4A, the content strings 406 in activities 402-1 thru 402-4 may grouped into one because they share the same domain ("abcde.com"), but they would not be grouped with, for example, activities associated with content in the domain "abcde.co.jp".

Key specification 422-2 specifies that for television networks (content strings that start with "tv://"), the key is the string after "tv://channel/". Key specification 422-3 specifies that for applications (content strings that start with "app://"), the key is the string in the first level of the path after the string "app://". Key specification 422-4 specifies that for operating system user interfaces (content strings that start with "os://"), the key is the string in the first level of the path after the string "os://". Key specification 422-5 specifies that for information views on the home screen (content strings that start with "home://"), the key is the string after the string "home://". Key specification 422-6 specifies that for searches (content strings that start with "search://"), the key is the string after the string "search://".

Analytics may be performed on the activities logged in activities log 230. Examples of analytics that may be performed includes analyzing the activities to determine overall content activity frequency on the client device 102, content activity frequency by time of day (so as to be able to make content suggestions based on time of day), content activity by content, and so on.

In some implementations, the data in the activities log 230 may be presented to users in some form (e.g., as described below with reference to FIGS. 5A-5D), analyzed by the client device 102 to suggest content to users (e.g., based on the analytics performed on the data in the log), and shared with third-party applications (e.g., applications 220), on the client device 102, that makes uses of content activity data.

Information corresponding to the activities in the activities log 230, which includes activities associated with various types of content, may be displayed to the user. FIGS. 5A-5D illustrate example screenshots of content activities information being displayed. FIG. 5A illustrates a home screen 500 of the client device 102, displayed on the display 206. The home screen 500 includes a content bar 501 and a quick search bar 503. A user may enter a query into the quick search bar 503 to make simple searches for content. The content bar 501 includes links to various information displays, including, for example, "Most Visited," "Recents," "History," and "What's On." A selection of an information display from the content bar 501 may be reported as an activity to the activities logging module 224 by the home screen module 238 (FIG. 3).

In FIG. 5B, an activities history 502 is displayed in the home screen 500 on the display 206 of a client device 102 (e.g., in response to the user selecting the "History" view in the content bar 501). The activities history 502 may be a chronological listing of activities on the client device 102, similar to a web browser history. The activities history 502 may include web page activity, application activity, television activity, operating system activity, search activity, and home screen activity in one listing, without separation (in some implementations, they may be displayed separately in accordance with user input).

In FIG. 5C, a set of recently accessed or visited content 504 is displayed in the home screen 500 on the display 206 of the client device 102 (e.g., in response to the user selecting the "Recents" view in the content bar 501). The recently accessed content 504 lists content that have been recently accessed (i.e., content associated with recent activity) on the client device 102 within a predefined time (e.g., the past week, the past month, etc.). The content, which includes various types such as television content, web pages, searches, applications, and so on, may be displayed in the recently accessed content 504 with thumbnails, if available, and a time of last access. In some implementations, a content item (e.g., "ABCDE Store") displayed in the recently accessed content 504 corresponds to a grouping or aggregation of multiple activities associated with related content (e.g., web pages within the same domain) and represents the most recent one of those grouped or aggregated activities.

Figure 5D:
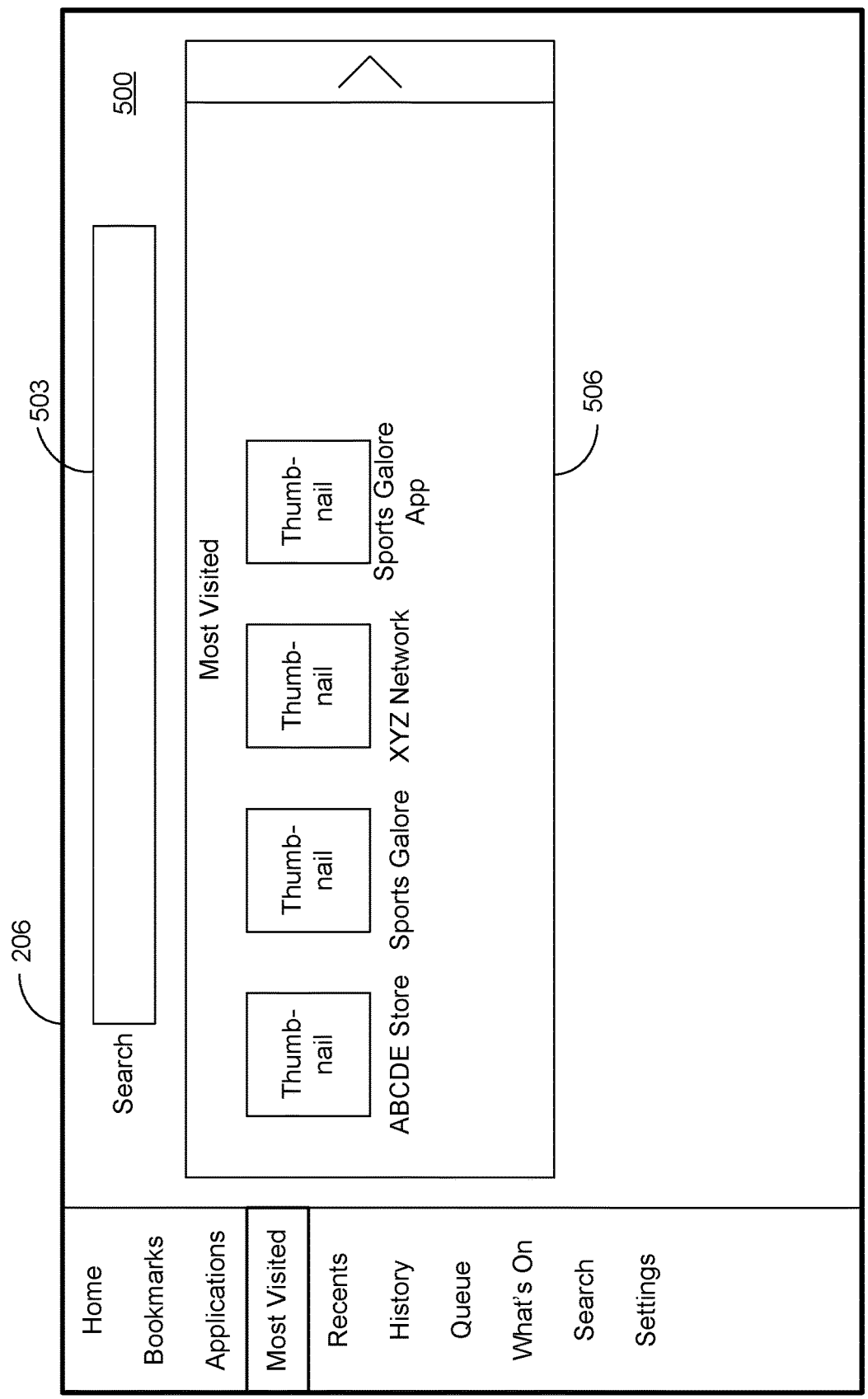

In FIG. 5D, a set of most accessed or visited content 506 is displayed in the home screen 500 on the display 206 of the client device 102 (e.g., in response to the user selecting the "Most Visited" view in the content bar 501). The most accessed content 506 lists content that have been most accessed on the client device 102 (i.e., content associated with the most activity) over the life of the client device 102 or over a defined period of time (e.g., the past month, the past two months, etc.). The content may be displayed in the most accessed content 506 with thumbnails, if available. In some implementations, a content item (e.g., "ABCDE Store") displayed in the most visited content 506 corresponds to a grouping or aggregation of multiple activities associated with related content (e.g., web pages within the same domain). In some implementations, how recent the last access to the content is also taken into account; frequently accessed content that was last accessed a long time ago (e.g., at a time past a predefined time threshold) may be omitted from display in favor of more recently accessed, frequently accessed content.

In some implementations, whether activities are grouped or aggregated for display purposes depend on the view in which information about the activities are displayed. For example, in the activities history 502, activities are not grouped or aggregated; each activity is an individual entry in the history 502. In the recently accessed content 504 or the most accessed content 506, activities may be grouped or aggregated.

In some implementations, messages reporting activities may be formatted not in URI syntax but in other formats. Such messages may be modified into URI syntax by the activities logging module 224 and logged in URI syntax in activities log 230.

FIG. 6 is a flow diagram illustrating a process 600 for logging activities at a device, according to some implementations. Each of the operations shown in FIG. 6 may correspond to instructions stored in a computer memory or computer readable storage medium. In some implementations, process 600 may be implemented at a client device 102.

The device (e.g., client device 102) performs (602) a first activity with content associated with a first content type selected from the group consisting of television programming, online content, on-device applications, search queries, information views, and other content types described using a predefined format. The activity may be associated with any of various content types that may be described using a predefined format, including television channels, online content items (e.g., web pages), on-device applications, search queries, information views, and other content types. Examples of activities with content associated with a content type include opening, launching, or displaying a content item of the content type, and performing a search and displaying the results, and displaying specified information views in a home screen of the client device 102. The activity is reported to an activities logging module 224 in the predefined format (e.g., in an intent message with a defined syntax), which includes an action specification, for the action in the activity, and a content specification, for the content of the content type with which the activity is associated.

In some implementations, the action specification and the content specification are formatted in Uniform Resource Identifier format (604). The action specification and the content specification both uses URI syntax to specify the action in an activity and to specify the content in the activity, whatever the action and whatever the type of content may be. For example, in intent messages reporting activities (e.g., messages 302, 304, 306, 308, or 310), the action and the content are specified in URI syntax.

The device logs (608) the first activity in accordance with the predefined format. The first activity is logged by the activities logging module 224 in the predefined format, whichever content type is associated with the content in the activity. Thus, for example, activities involving displaying a television channel, activities involving displaying web pages or opening applications, and so forth are logged in the same format. The content is logged in URI syntax. The action may be logged in URI syntax or extracted from the message reporting the action in URI syntax and logged in the extracted form.

In some implementations, the first content type is online content (606). Examples of online content include web pages, online video clips, and so on. In some implementations, the first activity includes displaying an online content item (e.g., displaying a web page or online video clip).

In some implementations, the device maps the first activity to a first display name based on a domain of an online content item associated with the first activity. When information corresponding to activities in the activities log 230 is displayed (e.g., in a recents view 504 or a most visited view 506), an activity may be represented by a user-friendly display name. The display name may be mapped to the activity based on the domain of the online content item in the activity. For example, if the activity is displaying a web page (i.e., the user views the web page), a name based on the domain may be used to represent the activity even if the actual content specification includes additional parameters or metadata.

In some implementations, the device logs multiple activities, each of which is respectively associated with an online content item, the respective associated online content items having a common domain; and groups the multiple activities together based on the common domain. The activities log 230 may include multiple activities, each associated with a respective online content item, where the respective online content items have a common domain (e.g., different web pages within the same domain, as in activities 402-1 thru 402-4, FIG. 4A). The activities with the online content items having the common domain may be grouped together based on the common domain, e.g., for display or analytics purposes. For example, in the most visited view 506, activities with web pages in the same domain may be grouped together and displayed as one instead of separately.

The device performs (610) a second activity with content associated with a second content type selected from the group consisting of television programming, online content, on-device applications, search queries, information views, and other content types described using the predefined format, where the second content type is distinct from the first content type. The activity may be associated with any of various content types that may be described using the predefined format, including television channels, online content items (e.g., web pages), on-device applications, search queries, information views, and other content types. Examples of activities with content associated with a content type include opening, launching, or displaying a content item of the content type, and performing a search and displaying the results, and displaying specified information views in a home screen of the client device 102. The activity is reported to an activities logging module 224 in the predefined format (e.g., in an intent message with a defined syntax.

The device logs (614) the second activity in accordance with the predefined format. The second activity is logged by the activities logging module 224 in the predefined format, whichever content type is associated with the content in the activity. The content is logged in URI syntax. The action may be logged in URI syntax or extracted from the message reporting the action in URI syntax and logged in the extracted form. Thus, activities with content of different types may be reported and logged in the same format.

In some implementations, the second content type is television programming (612). Examples of television programming include television channels and the programs in those channels. In some implementations, the second activity includes displaying a television channel (and whatever program is on the channel at the time of the activity).

In some implementations, the device maps the second activity to a second display name based on the television channel associated with the second activity. For example, if the activity is displaying a television channel or a program on that channel (i.e., the user views the channel/program), a name based on the television channel (e.g., the name of the network on that channel) may be used to represent the activity.

In some implementations, the device logs multiple activities, each of which is respectively associated with the same television channel; and groups the multiple activities together based on the common television channel. The activities log 230 may include multiple activities, each associated with a respective television programming from the same television channel. The activities with the television programming from the same television channel may be grouped together based on the common channel, e.g., for display or analytics purposes. For example, in the most visited view 506, activities with television programming from the same channel may be grouped together and displayed as one instead of separately.

The device performs (616) a third activity with content associated with a third content type selected from the group consisting of television programming, online content, on-device applications, search queries, information views, and other content types described using the predefined format, where the third content type is distinct from the first content type and the second content type. The activity may be associated with any of various content types that may be described using the predefined format, including television channels, online content items (e.g., web pages), on-device applications, search queries, information views, and other content types. Examples of activities with content associated with a content type include opening, launching, or displaying a content item of the content type, and performing a search and displaying the results, and displaying specified information views in a home screen of the client device 102. The activity is reported to an activities logging module 224 in the predefined format (e.g., in an intent message with a defined syntax.

The device logs (620) the third activity in accordance with the predefined format. The third activity is logged by the activities logging module 224 in the predefined format, whichever content type is associated with the content in the activity. The content is logged in URI syntax. The action may be logged in URI syntax or extracted from the message reporting the action in URI syntax and logged in the extracted form. Thus, activities with content of different types may be reported and logged in the same format.

In some implementations, the third content type is on-device application (618). In some implementations, the third activity includes activating (e.g., opening or launching) an on-device application. Other examples of activity with an on-device application include opening or displaying an interface within the application and viewing specific data in the application.

Figure 7A:
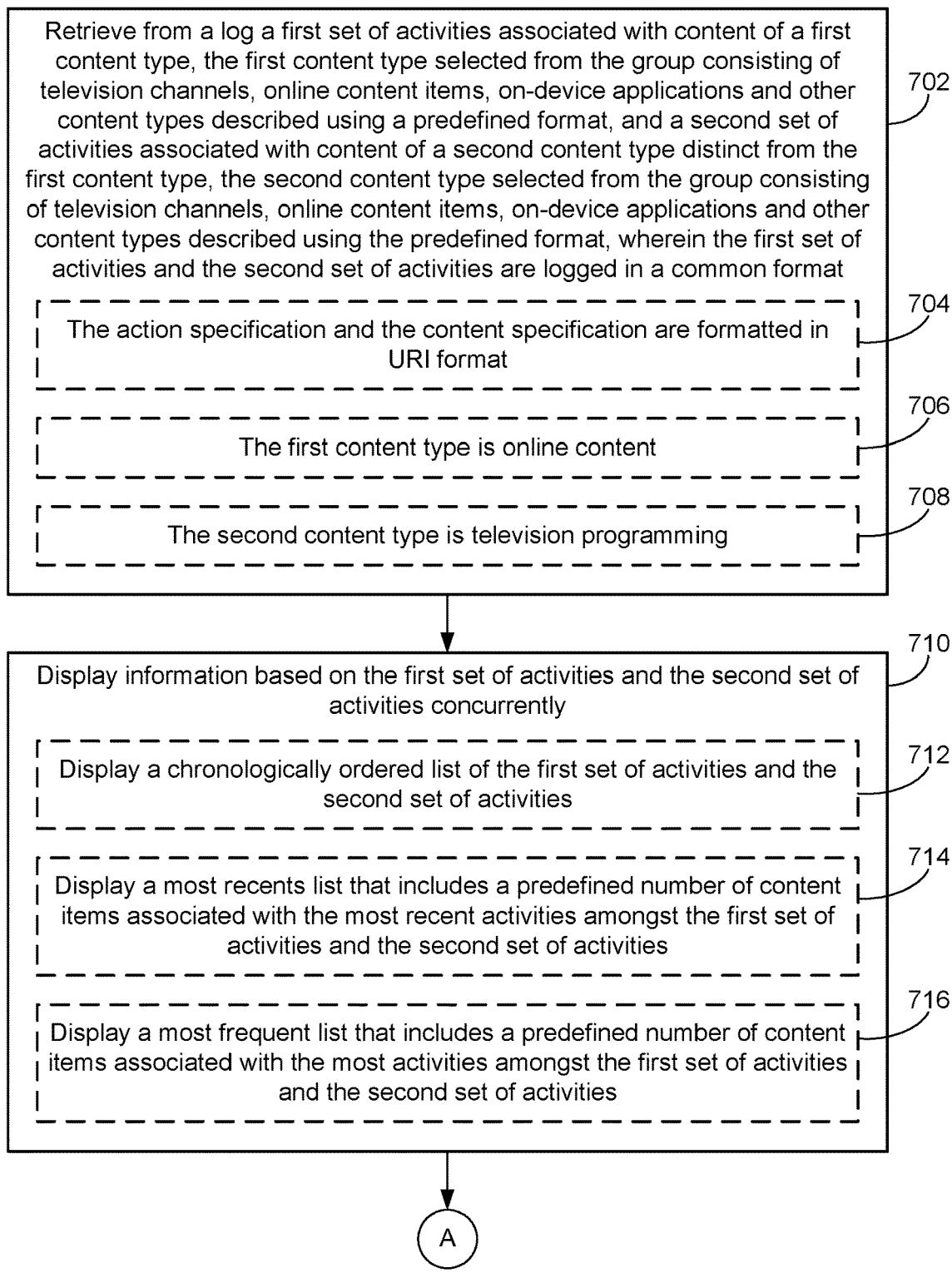
FIGS. 7A-7B are flow diagrams illustrating a process for displaying information based on logged activities at a device, according to some implementations.
Figure 7B:
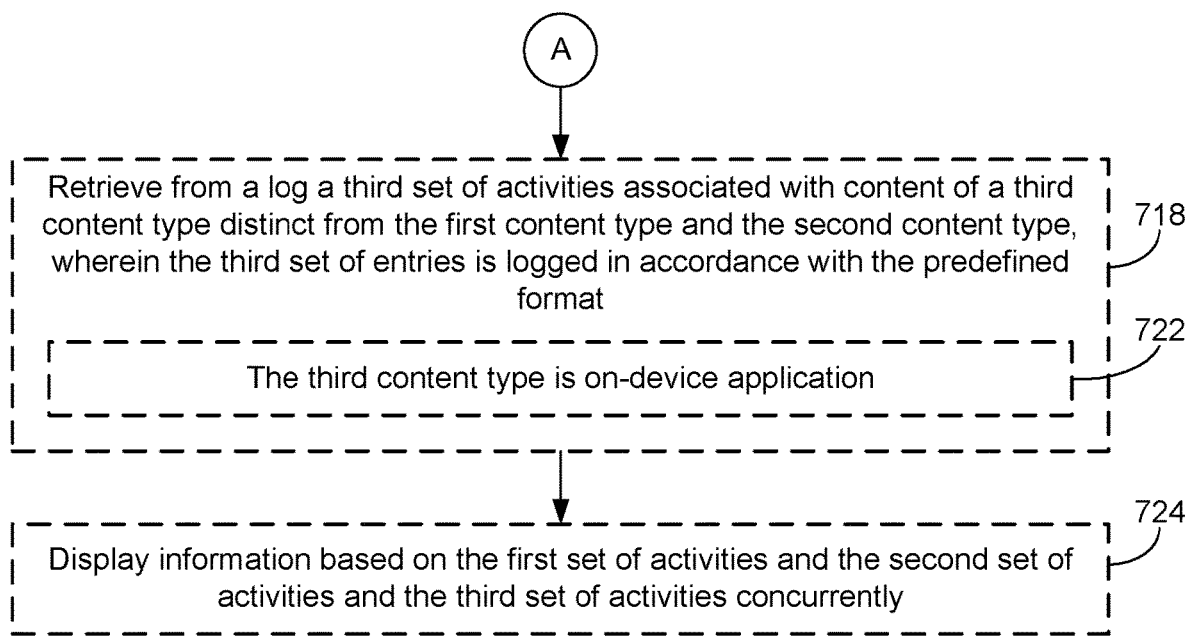

FIG. 7 is a flow diagram illustrating a process 700 for displaying information based on logged activities at a device, according to some implementations. Each of the operations shown in FIG. 7 may correspond to instructions stored in a computer memory or computer readable storage medium. In some implementations, process 700 may be implemented at a client device 102.

The device retrieves (702) from a log a first set of activities associated with content of a first content type, the first content type selected from the group consisting of television programming, online content, on-device applications, search queries, information views, and other content types described using a predefined format, and a second set of activities associated with content of a second content type distinct from the first content type, the second content type selected from the group consisting of television programming, online content, on-device applications, search queries, information views, and other content types described using the predefined format. The predefined format includes an action specification and a content specification. The first set of activities and the second set of activities are logged in accordance with the predefined format. The device retrieves log entries for activities with content of a first type and activities with content of a second type different from the first type. For example, the device may retrieve from activities log 230 in FIG. 4A activities 402-1 thru 402-4 and activity 402-7. Activities 402-1 thru 402-4 are associated with online content and activity 402-7 is associated with television programming. The retrieved activities were reported to the activities logging module in a predefined format, e.g., an action specification and a content specification. In some implementations, the action and the content specification are formatted in URI format (704).

The device displays (710) information based on the first set of activities and the second set of activities concurrently. For example, in an activities history 502 (FIG. 5B) that is displayed, a set of activities involving online content and a set of activities involving television programming are displayed together and concurrently. As another example, recently accessed content 504 or most accessed content 506 that includes content of different types, derived from the first set of activities and the second set of activities, may be displayed.

In some implementations, the first content type is online content (706). In some implementations, the first set of activities includes a subset of activities that are associated with respective online content items having a common domain, and displaying information based on the first set of activities and the second set of entries concurrently includes displaying information corresponding to the subset of events grouped together based on the common domain. For example, activities associated with web pages in a common domain (e.g., activities 402-1 thru 402-4, FIG. 4A), may be grouped together based on the common domain and information based on the group may be displayed (e.g., if the common domain is most visited, a representation of the group is included in the most visited content 506).

In some implementations, the second content type is television programming (708). In some implementations, the second set of activities includes a subset of activities that are associated with a common television channel, and displaying information based on the first set of activities and the second set of activities concurrently includes displaying information corresponding to the subset of activities grouped together based on the common television channel. For example, activities associated with television programming from a common television channel, may be grouped together based on the common channel and information based on the group may be displayed (e.g., if the common channel is most watched, a representation of the group is included in the most visited content 506).

In some implementations, displaying information based on the first set of activities and the second set of activities concurrently includes displaying a chronologically ordered list of the first set of activities and the second set of activities (712). For example, a chronologically ordered history 502 of activities may be displayed. The chronologically ordered history 502 may include activities associated with different content types, such as activities associated with online content, activities associated with television programming, and so on.

In some implementations, displaying information based on the first set of activities and the second set of activities concurrently includes displaying a most recents list that includes a predefined number of content items associated with the most recent activities amongst the first set of activities and the second set of activities (714). For example, a view displaying recently accessed content 504 may be displayed. The recently accessed content 504 may include content accessed by the most recent activity.

In some implementations, displaying information based on the first set of activities and the second set of activities concurrently includes displaying a most frequent list that includes a predefined number of content items associated with the most activities amongst the first set of activities and the second set of activities (716). For example, a view displaying most accessed content 506 may be displayed. The most accessed content 506 may include content most frequently accessed on the client device 102. In some implementations, how recent the last access to the content is also taken into account when displaying the most accessed content; a frequently accessed content that was last accessed at a time past a predefined time threshold may be omitted from display, for example.

In some implementations, the device retrieves (718) from a log a third set of activities associated with content of a third content type distinct from the first content type and the second content type, wherein the third set of entries is logged in accordance with the predefined format, and displays (724) information based on the first set of activities and the second set of activities and the third set of activities concurrently. In some implementations, the third content type is on-device application (722).

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference has been made in detail to implementations, examples of which are illustrated in the accompanying drawings. In the above detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the implementations.

The foregoing description, for purpose of explanation, has been described with reference to specific implementations. The implementations were chosen and described in order to best explain the principles of the invention and its practical applications, to thereby enable others skilled in the art to best utilize the invention and various implementations with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method of combining activity histories, comprising:
at a client device having one or more processors and memory storing one or more programs executed by the device:
performing a plurality of activities, each of the plurality of activities being performed in a respective application with content associated with a content type selected from a group consisting of television programming, online content, on-device application, information views, and other content types, wherein each activity is associated with a timestamp, and described using a predefined format including an action specification string specifying an action and a content specification string specifying content associated with the action;
logging each of the plurality of activities, including:
for each of the plurality of activities performed by different applications, formatting the action specification string and the content specification string according to a consistent data structure format across different content types of the group, wherein the action specification string includes (i) an intent message that specifies an activity from the plurality of activities and (ii) an action string that specifies the action and wherein the content specification string includes (i) a type string that specifies the content type associated with the content and (ii) a path string that identifies the content associated with the action; and
storing in an activities log the respective timestamp, the respective action specification string, and the respective content specification string according to the consistent data structure format; and
displaying concurrently in a home screen on a display of the client device a plurality of user selectable affordances, each of the affordances being associated with one of the plurality of activities performed with associated content, the plurality of affordances including at least two affordances associated with two distinct activities of the plurality of activities performed by two distinct applications.

2. The method of claim 1, wherein for each of the plurality of activities, the action specification string and the content specification string are formatted according to Uniform Resource Identifier (URI) syntax that provides the consistent data structure format for the action specification string and the content specification string across the different content types of the group.

3. The method of claim 1, wherein displaying concurrently the plurality of user selectable affordances comprises displaying a chronologically ordered list of a subset of the plurality of activities associated with the plurality of user selectable affordances.

4. The method of claim 1, wherein displaying concurrently the plurality of user selectable affordances comprises displaying a most recent list that includes a set of content items associated with the most recent activities amongst the plurality of activities.

5. The method of claim 4, wherein the set of content item includes a predefined number of content items.

6. The method of claim 1, wherein displaying concurrently the plurality of user selectable affordances comprises displaying a most frequent list that includes a set of content items associated with the most frequent activities amongst the plurality of activities.

7. The method of claim 6, wherein the set of content items includes a predefined number of content items.

8. The method of claim 1, wherein:
the plurality of user selectable affordances comprises a plurality of thumbnails and their respective times of last access; and
in accordance with the two distinct activities of the plurality of activities performed by the two distinct applications, the at least two affordances include (1) a first thumbnail associated with a first action, a first content and a first timestamp indicating a first time of last access, and (2) a second thumbnail associated with a second action, a second content and a second timestamp indicating a second time of last access.

9. The method of claim 1, further comprising:
displaying concurrently the plurality of user selectable affordances with a content bar including a plurality of information display affordances, and wherein the plurality of user selectable affordances are displayed in response to a user selection of one of the information display affordances in the content bar.

10. The method of claim 9, wherein the information display affordances associated with one or more information items of "Bookmarks," "Applications," "Most Visited," "Recents," "History," "Queue" and "What's On."

11. The method of claim 1, further comprising:
mapping the respective content string to at least one of a respective display name and a respective thumbnail image in the activities log to represent the plurality of user selectable affordances on the home screen.

12. A system, comprising:
one or more processing units; and
memory storing one or more programs to be executed by the one or more processing units, the one or more programs comprising instructions for:
performing a plurality of activities, each of the plurality of activities being performed in a respective application with content associated with a content type selected from a group consisting of television programming, online content, on-device application, information views, and other content types, wherein each activity is associated with a timestamp, and described using a predefined format including an action specification string specifying an action and a content specification string specifying content associated with the action;

logging each of the plurality of activities in accordance with the predefined format, including:
for each of the plurality of activities performed by different applications, formatting the action specification string and the content specification string according to a consistent data structure format across different content types of the group, wherein the action specification string includes (i) an intent message that specifies an activity from the plurality of activities and (ii) an action string that specifies the action and wherein the content specification string includes (i) a type string that specifies the content type associated with the content and (ii) a path string that identifies the content associated with the action; and
storing in an activities log the respective timestamp, the respective action specification string, and the respective content specification string according to the consistent data structure format;

displaying concurrently in a home screen on a display a plurality of user actionable affordances, each of the affordances being associated with one of the plurality of activities performed with associated content, the plurality of affordances including at least two affordances associated with two distinct activities of the plurality of activities performed by two distinct applications, wherein the plurality of user actionable affordances includes a first user actionable affordance associated with a first activity performed with a television program provided via a first media action using one or more tuners for tuning to a corresponding channel in content signals transmitted from a video content system; and in response to a user action on the first user actionable affordance, executing the first media action to load the television program using the one or more tuners to tune to the corresponding channel.

13. The system of claim 12, wherein the one or more programs further comprise instructions for:
displaying concurrently the plurality of user actionable affordances with a search bar, wherein the plurality of user actionable affordances are displayed in response to a search query entered in the search bar.

14. The system of claim 12, wherein the instructions for logging each of the plurality of activities further comprise instructions for:
logging a subset of the plurality of activities, wherein each activity in the subset is associated with a respective online content item, and the respective associated online content items have a common web domain; and
grouping the subset of the plurality of activities together based on the common web domain.

15. The system of claim 12, wherein the instructions for logging each of the plurality of activities further comprise instructions for:
logging a subset of the plurality of activities that are associated with a common television channel; and
grouping the subset of the plurality of activities together based on the common television channel.

16. The system of claim 12, wherein each of the two distinct activities of the plurality of activities is mapped to a distinct display name based on a web domain or a television channel associated with the respective distinct activity of the plurality of activities.

17. A non-transitory computer readable storage medium storing one or more programs configured for execution by one or more processors of a computer system, the one or more programs comprising instructions for:
performing a plurality of activities, each of the plurality of activities being performed in a respective application with content associated with a content type selected from a group consisting of television programming, online content, on-device application, information views, and other content types, wherein each activity is associated with a timestamp, and described using a predefined format including an action specification string specifying an action and a content specification string specifying content associated with the action;

logging each of the plurality of activities in accordance with the predefined format, including:
for each of the plurality of activities performed by different applications, formatting the action specification string and the content specification string according to a consistent data structure format across different content types of the group, wherein the action specification string includes (i) an intent message that specifies an activity from the plurality of activities and (ii) an action string that specifies the action and wherein the content specification string includes (i) a type string that specifies the content type associated with the content and (ii) a path string that identifies the content associated with the action; and
storing in an activities log the respective timestamp, the respective action specification string, and the respective content specification string according to the consistent data structure format; and displaying concurrently in a home screen on a display a plurality of user actionable affordances, each of the affordances being associated with one of the plurality of activities performed with associated content, the plurality of affordances including at least two affordances associated with two distinct activities of the plurality of activities performed by two distinct applications, wherein the plurality of user actionable affordances includes a first user actionable affordance associated with a first activity performed with a television program provided via a first media action using one or more tuners for tuning to a corresponding channel in content signals transmitted from a video content system; and in response to a user action on the first user actionable affordance, executing the first media action to load the television program using the one or more tuners to tune to the corresponding channel.

18. The non-transitory computer readable storage medium of claim 17, wherein each of the plurality of activities includes one or more grouping keys, and the one or more programs further comprise instructions for:
after logging each of the plurality of activities, grouping the plurality of activities according to the one or more grouping keys of each activity.

19. The non-transitory computer readable storage medium of claim 18, wherein at least one of the one or more grouping keys of each activity is defined according to a content type of the respective activity.

20. The non-transitory computer readable storage medium of claim 17, wherein the at least two affordances are associated with the two distinct activities performed on online content and television programming, respectively.

* * * * *